Jan. 6, 1931.   J. A. LUND   1,788,116
ANCHOR RING
Filed May 27, 1927
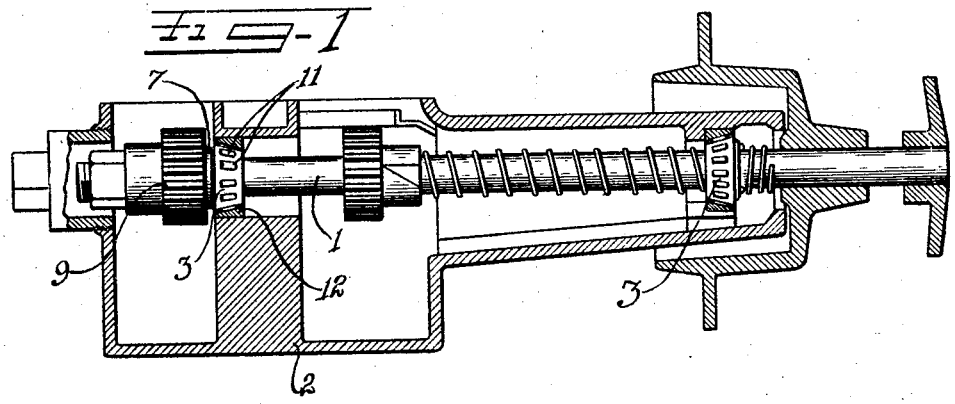
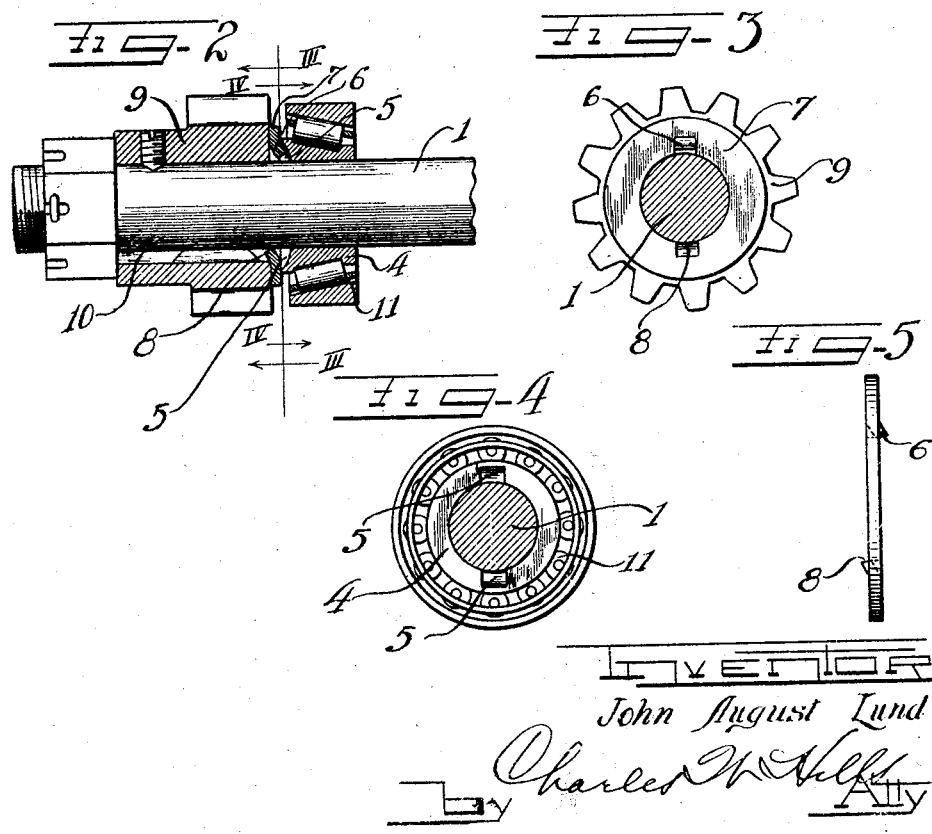
Inventor
John August Lund
by Charles W. Neff
Atty Patented Jan. 6, 1931

1,788,116

UNITED STATES PATENT OFFICE

JOHN AUGUST LUND, OF BATAVIA, ILLINOIS, ASSIGNOR TO CHALLENGE CO., OF BATAVIA, ILLINOIS, A CORPORATION OF ILLINOIS

ANCHOR RING

Application filed May 27, 1927. Serial No. 194,639.

This invention relates to an anchor ring and concerns itself with a structure for anchoring a sleeve or bearing upon a shaft against rotation without the necessity of a key or the like.

The invention comprises the novel structure and combination of parts hereinafter described and more particularly pointed out and defined in the appended claims.

In the accompanying drawings which illustrate a preferred embodiment of this invention and in which similar reference numerals refer to similar features in the different views:

Figure 1 is a sectional view through a housing in which a shaft is journaled upon which a bearing is anchored against rotation according to this invention.

Figure 2 is an enlarged fragmentary sectional view showing the shaft in elevation, of the structure shown in Figure 1, illustrating the one use of the anchor ring.

Figure 3 is an end elevational view of a gear to which the anchor ring is anchored against rotation, taken on the line III—III of Figure 2.

Figure 4 is an enlarged end elevational view of the bearing which is designed to be anchored against rotation, taken upon the line IV—IV of Figure 2.

Figure 5 is an edge elevational view of the anchor ring.

As shown on the drawings:

This invention is illustrated in connection with a shaft 1 which is journaled in a casing 2 principally by means of roller bearings 3. These roller bearings usually consist of an inner bearing or sleeve 4 which should be anchored upon the shaft. It is expensive to provide key ways and keys for securing the sleeve bearings to the shaft. To avoid the cost, time, and labor involved in constructing key ways, I provide indentations 5 which may be easily and cheaply formed in one end of the bearing. Any number of indentations may be made and they may be variously arranged. In the preferred construction, however, a pair of diametrically opposite indentations are only used.

One of the indentations 5 is adapted to be engaged by a spur 6 on an anchor ring 7. The opposite side of the anchor ring 7 is provided with a similar spur 8 which is preferably diametrically opposite the spur 6. The spur 8 is adapted for engaging an indentation upon a collar, gear, or abutment fast upon the shaft 1.

In the present instance, the roller bearing 3 happens to be located adjacent a gear 9 which is keyed upon the shaft, the key way 10 of which extends through the gear and serves as an indentation for receiving the spur 8 on the anchor ring 7.

In assembling the parts, the gear 9 is slid on the shaft into position with the key engaging the key way 10. The anchor ring 7 is then slipped upon the shaft and the spur 8 is anchored in the key way 10. The bearing sleeve 4 with its cage of rollers 11 positioned thereon is then slipped upon the shaft against the anchor ring 7, the sleeve being properly aligned to bring the spur 6 on the anchor ring into engagement with a recess 5, whereby the gear 9, anchor ring 7, and sleeve bearing 4 become interlocked for conjoint rotation. The outer ring bearing 12 for the roller bearing may then be placed in position.

It will be appreciated that this invention greatly reduces the time, labor, and expense in securing bearings and the like upon shafts, and at the same time makes assembling much easier.

I am aware that many changes may be made, and numerous details of construction may be varied through a wide range without departing from the principles of this invention, and I therefore do not purpose limiting the patent granted hereon, otherwise than necessitated by the prior art.

I claim as my invention:

1. The combination with a revolvable shaft having a keyway, of a member having a keyway, a key extending in said keyway for keying said member to said shaft, a second member freely slidable upon said shaft and having an indentation, an anchor ring having outwardly projecting spurs on the vertical sides thereof and engaging the keyway in the first member and said indentation for anchoring the second member to the first member against relative rotation.

2. A revolvable shaft, a housing, an apertured abutment member adjustably mounted on the shaft for rotation therewith, a bearing slidable in the housing including an apertured revolvable bearing member slidably mounted on the shaft, means connecting the said abutment member and the said bearing member consisting of a coupling ring disposed between the said members and having oppositely upset portions engaging in the apertures in the said members, the said bearing and the bearing member being normally unrestrained against movement in the housing in one direction along the shaft.

3. The combination with a revolvable shaft having a stationary abutment with an indentation therein, an indented cylindrical member mounted on the shaft adjacent the said abutment member arranged for movement without rotation along the shaft in one direction, and an anchor ring disposed between the said abutment and the said member, the said anchor ring having oppositely struck spurs adapted to enter the indentations in the said abutment and the said member.

In testimony whereof I have hereunto subscribed my name at Batavia, Kane County, Illinois.

JOHN AUGUST LUND.